May 13, 1969 G. L. BACHNER 3,443,786

MOLD STRUCTURE

Filed Jan. 11, 1967 Sheet 1 of 3

May 13, 1969 G. L. BACHNER 3,443,786

MOLD STRUCTURE

Filed Jan. 11, 1967 Sheet 2 of 3

INVENTOR.
George L. Bachner,
BY Parker & Carter
Attorneys.

MOLD STRUCTURE

INVENTOR.
George L. Bachner,
BY Parker & Carter
Attorneys.

United States Patent Office 3,443,786
Patented May 13, 1969

1

3,443,786
MOLD STRUCTURE
George L. Bachner, Chicago, Ill., assignor to Majestic Tile Company, Melrose Park, Ill., a corporation of Delaware
Filed Jan. 11, 1967, Ser. No. 608,629
Int. Cl. B28b 7/10; B22d 17/00
U.S. Cl. 249—68 5 Claims

ABSTRACT OF THE DISCLOSURE

A mold structure having two mold parts formed with recessed and extending areas and adapted to close in registry to form a plurality of mold cavities, such cavity having, in part, two irregular surfaces and an opposed grooved surface which enable injection molding of a decorative facing tile having surfaces textured to resemble brick and mortar on one side and bearing ridges on the other side which enable the bottom-most brick in a stack of bricks to be slid outwardly beneath the stack without jamming.

This invention relates generally to injection molding structures, and more particularly to a mold structure for use in injection molding of decorative facing tile having the appearance and texture of brick and mortar.

Accordingly, a primary object of this invention is to provide a mold structure for use in an injection molding machine, which has cavities formed therein having surfaces contoured such that a part produced therefrom has surfaces textured to simulate the surface texture of conventional brick and mortar.

Another object is to provide a mold structure having a plurality of mold cavities as above described.

A further object is an economical mold structure for use in producing molded items having an irregular surface which is textured to simulate conventional brick, mortar or the like.

Yet, another object is to provide an economical mold structure comprising two mold parts adapted to close in registry and form a plurality of mold cavities, with the surfaces of each cavity formed such that decorative, brick resembling, facing tiles may be molded therein which have a mortar joint along two adjoining edges and bearing ridges lying in a bearing plane which enable the bottom-most tile in a stack of such tiles to be slid outwardly beneath the stack without jamming.

Other objects and advantages of the invention will become apparent upon reading the following description of the invention.

The invention is illustrated more or less diagrammatically in the accompanying drawings wherein.

Figure 1:
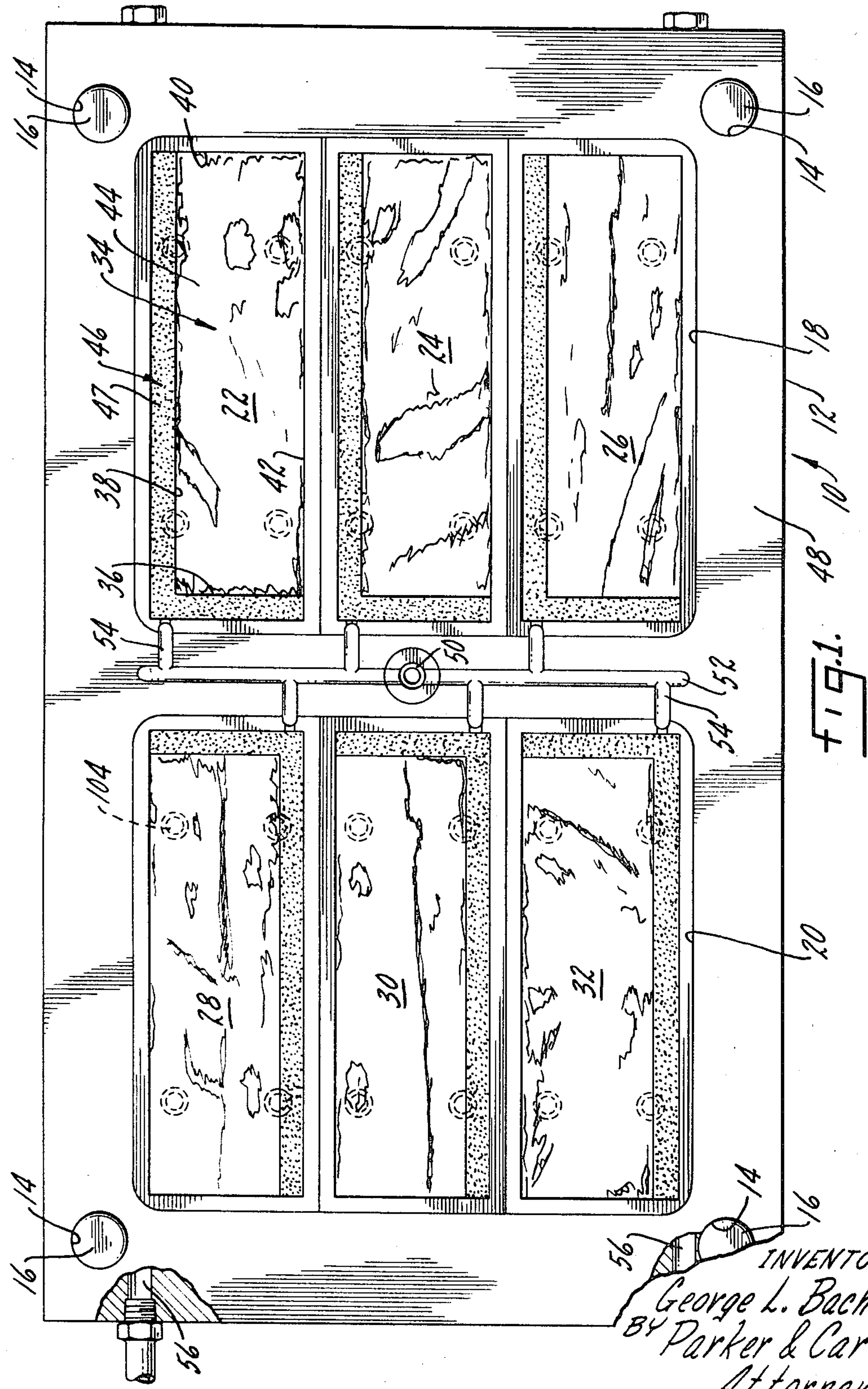
FIGURE 1 is a partial elevational view of one mold part of the mold structure of this invention.

Referring now to FIGURE 1, a first mold part structure is shown generally at 10 as comprising a rectangular plate 12 having a top surface 48 and formed with circular bores 14 in the corners thereof. Each bore 14 contains an alignment dowel 16 suitably secured therein. The plate 12 is formed with two channels 18 and 20 which are adapted to receive mold inserts 22, 24 and 26 and 28, 30 and 32 respectively. Although plate 12 has been depicted as being solid, it should be understood that plate 12 could be a laminated structure.

2

Each mold insert contains a generally rectangular well, such as at 34, formed by sidewalls 36, 38, 40 and 42 and irregular bottom surface 44. A recessed, L-shaped, step 46, having a bottom surface 47 positioned intermediate the top surface 48 of plate 12 and the bottom surface 44 of well 34, bounds intersecting well sidewalls 36 and 38.

A generally circular aperture or sprue 50 extends through plate 12 between channels 18 and 20. Semi-circular troughs or runners 52 are formed in the top surface 48 of the plate 12 and extend radially from sprue 50. The bounding recessed step 46 of each well 34 is connected to runner 52 by a connecting runner 54.

The plate 12 may be provided with a system of conduits 56 through which cooling fluid may be circulated in order to regulate the temperature of such plate during use thereof.

Figure 2:
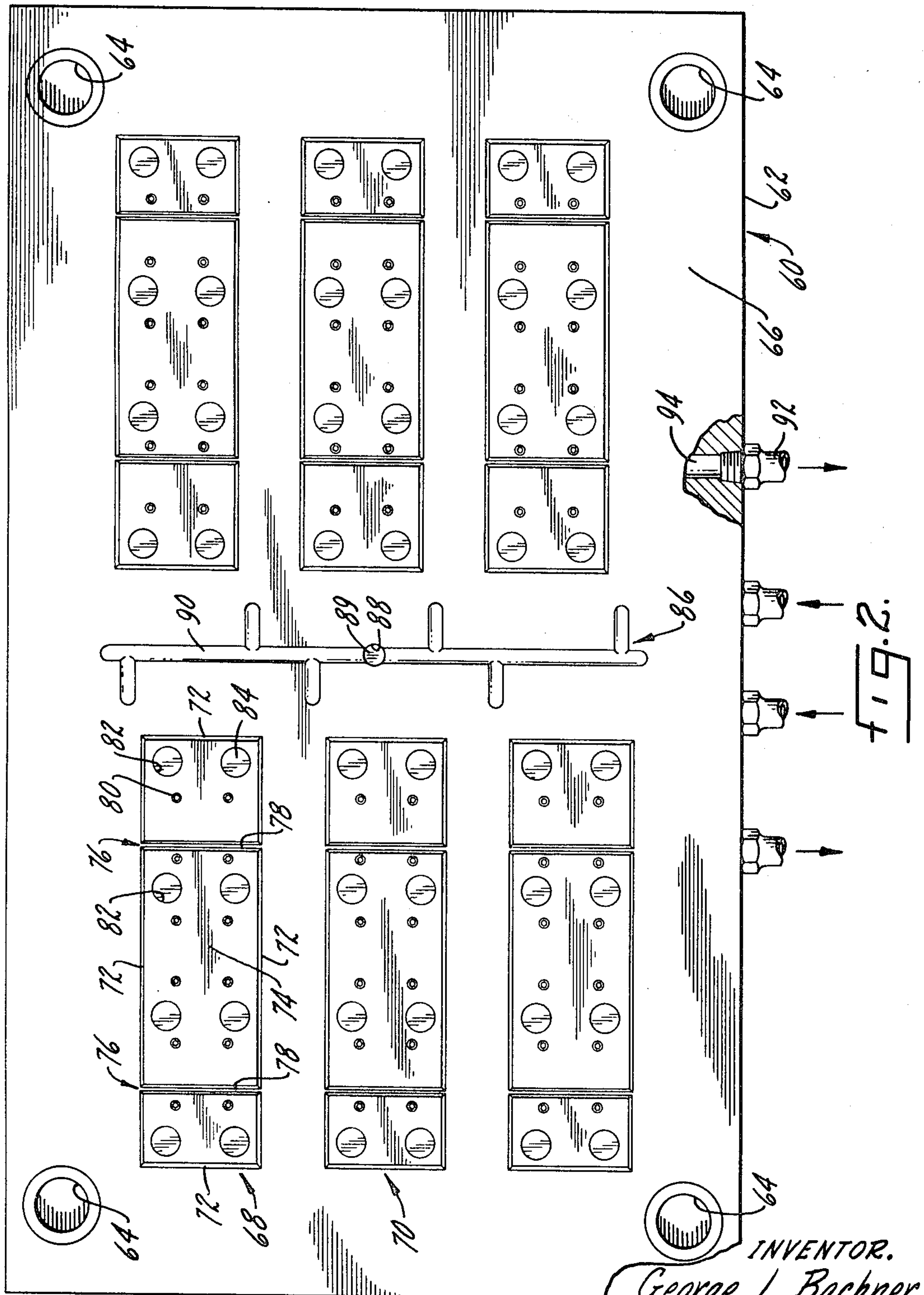
FIGURE 2 is a partial elevational view of a second mold part adapted to close in registry upon the mold part of FIGURE 1.

Referring now to FIGURE 2, a second mold part adapted to mate in registry with mold part 10 is shown generally at 60 as comprising a generally rectangular plate 62 having guide apertures 64 in the corners thereof which are adapted to slidably receive alignment dowels 16.

The plate 62 has a plurality of raised generally rectangular portions as at 68 and 70 extending from a top surface 66. Each raised portion is bounded by tapered sidewalls 72 and top surface 74 and is traversed by tapered grooves 76 having flat bottom surfaces 78 which are generally coplanar with plate surface 66. Each raised portion contains a plurality of depressions, as at 80, having a depth not exceeding the depth of groove 76 and a plurality of apertures 82 which extend through plate 62 and are adapted to slidably receive ejector pins 84 as shown in FIGURE 3.

The mold part 60 contains a runner system 86 comprising an aperture or sprue extension 88 extending through plate 60 and communicating, semi-circular, troughs or runners 90 formed in surface 66 of plate 62. The sprue extension 88 is adapted to receive ejector pin 89 and is positioned relative to guide apertures 64 so that when mold parts 10 and 60 are closed, as shown in FIGURE 3, with alignment dowels 16 of mold part 10 extending into guide apertures 64 of mold part 60, the sprue extension 88 forms an axial extension of sprue 50 as shown in FIGURE 3. The semi-circular runners 90 are positioned relative to guide apertures 64 so that when mold parts 10 and 60 are closed as in FIGURE 3 and described above, corresponding portions of the runners 90, 52 and 54 form a circular aperture or runner as at 92 which communicates with sprue 50 and mold cavities 100 which will be hereinafter described.

The plate 62 may be provided with suitable conduits 94, having end fittings 96, adapted for introduction, circulation, and discharge of a cooling fluid.

Figure 3:
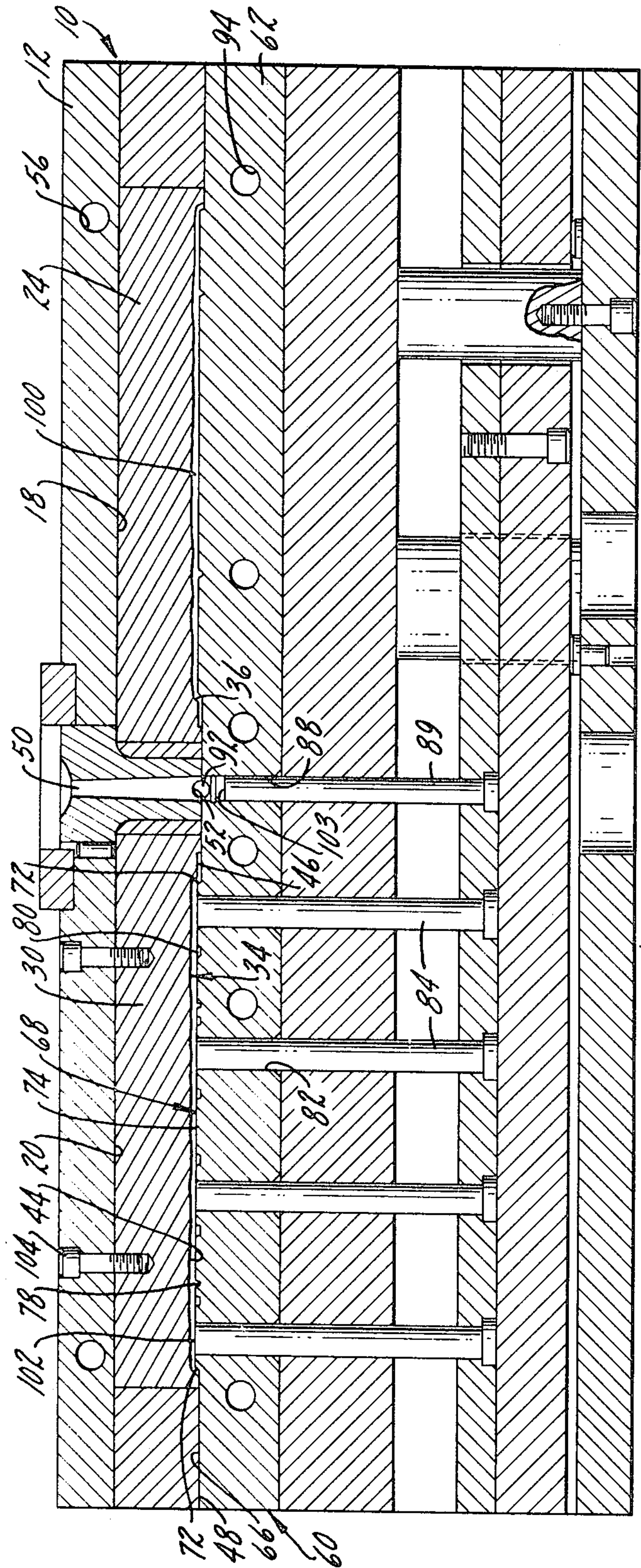
FIGURE 3 is a sectional view of the mold structure of this invention mounted in a suitable injection molding device.

IN FIGURE 3, the mold parts 10 and 60 are shown in a closed operative relationship. A portion of a suitable injection molding machine in which the mold structure of this invention may be mounted is shown generally at 98. As may be noted from FIGURE 3, the raised portions 68 on plate 62 are positioned with respect to the alignment apertures 64 so that, when mold portion 10 is closed upon mold portion 60 with alignment dowels 16 engaging alignment apertures 64, each such raised portion 68 extends into a well 34. The raised portions have a height, width and length dimension respectively smaller than the depth, width and length dimension of the wells 34 so that when the mold parts 10 and 60 are closed, a mold cavity 100 is formed. Ejector pins 84 and 89 respectively having end surfaces 102 and 103, extend from the molding machine 98 into the apertures 82 and 88 of mold part 60. The ejector pins 84 are positioned so that the top surface 102 is approximately flush with the top surface 74 of raised portion 68 when the mold parts are closed.

Each mold cavity 100 is connected to sprue 50 by the circular runner 92 formed by the semi-circular runners 52, 54 and 90.

The mold inserts, such as insert 30, may be fixedly retained to plate 12 by a suitable fastener 104.

The use, operation and function of the invention are as follows:

This invention provides a mold structure, for use in an injection molding machine, with which decorative facing tile having two irregular top surfaces respectively textured to resemble brick and mortar and bearing ridges which enable the bottom-most tile in a stack of tiles to be slid outwardly beneath the stack without jamming.

The mold parts 10 and 60 are suitably mounted in an injection molding machine 98 with either one part fixed and the other part movable or with both parts movable. After the mold parts are closed in registry and the top surface 102 of each ejector pin 84 is positioned flush with surface 74 of mold part 60, mold material is injected into the mold cavities 100 through sprue 50 and runners 92. Solidification of the mold material within the mold cavities 100 may be hastened and the temperature of the mold parts 10 and 60 regulated by circulating a cooling fluid through conduits 56 and 94.

When the mold material has solidified within the mold cavities 100, the mold parts are separated, with either one or both parts moving and the jector pins 84 and 89 are extended through mold part 60, thereby ejecting the finished tile.

Although mold parts 10 and 60 have been depicted and described as having six mold inserts and six corresponding raised portions, thereby forming six mold cavities 100, it should be understood that the mold parts may be formed to produce any number of mold cavities.

Preferably, the mold inserts 22, 24, 26, 28, 30 and 32 are metallic castings and the irregular surfaces 44 and 47, which respectively form surfaces in the finished tile which are textured to resemble brick and mortar, are in an as-cast condition.

The grooves 76 in raised portions 68 form bearing ridges in the finished tile on a side opposite the brick and mortar resembling surfaces. Such bearing ridges or surfaces enable the bottom-most brick in a stack of bricks to be slid outwardly beneath the stack without jamming. In such a stack of tiles, the bearing ridges formed by grooves 76 rest on the high points of the brick resembling surface formed by well bottom surface 44. Since the depth of the depressions 80 is not greater than the depth of the grooves 76, the tile pips formed by such depressions will not hang up on the brick resembling surface formed by well bottom surface 44.

Although a preferred embodiment of the invention has been depicted and described, such embodiment is intended to be exemplary only, and not definitive. Accordingly, the scope of the invention should be limited only by the scope of the following appended claims.

I claim:

1. A mold structure for molding decorative facing tile, said structure comprising:

a first mold part and a second mold part, at least one mold insert fixedly mounted in said first mold part, a generally rectangular well formed in said mold insert and having four sidewalls respectively joining an irregular bottom surface, a stepped recession bounding two of said intersecting sidewalls and having a depth less than the depth of said well, a raised generally rectangular portion extending from said second mold part corresponding to each well in said first mold part, a plurality of depressions formed in each said raised portion, grooves formed in each said raised portion extending transversely to the longitudinal axis of said raised portion, said grooves having a depth at least as great as the depth of said depressions, said raised portions having length, width and height dimensions repsectively less than the length, width and depth dimensions of said well, said mold parts adapted to close in registry so that each raised portion extends into a well thereby forming a mold cavity having the contour of the desired decorative facing tile, and means formed in said mold parts for delivery of mold material to each said cavity.

2. The mold structure of claim 1 further characterized in that cooling means are formed in said mold parts, said means comprising at least one conduit in each mold part adapted to receive, circulate and discharge the cooling fluid.

3. The mold structure of claim 1 further characterized in that said second mold part contains a plurality of apertures in each said raised portion, each aperture adapted to slidably house an ejector pin, and means for extending said ejector pins beyond said raised portion after separation of said mold parts so that a finished molded tile may be ejected therefrom.

4. The mold structure of claim 1 further characterized in that said mold insert is formed with a cast metallic material and the bottom surface of said well and said stepped recession is an irregular as-cast surface so that an impression made therefrom has surfaces textured to resemble the surface texture of brick and mortar.

5. A mold structure for molding decorative facing tile, said structure comprising:

a first mold part and a second mold part;

a plurality of ejector pins slidably housed in said second mold part and having planar end surfaces;

said mold parts and ejector pins adapted to close in registry to form at least one mold cavity;

means formed in said mold parts for delivery of mold material to each said mold cavity;

each said mold cavity being defined by: the end surfaces of said ejector pins; a generally rectangular well in said first mold part having intersecting side, end and bottom surfaces, said bottom surface being irregular so that an impression made therefrom resembles a brick in surface texture, an L-shaped step bounding an intersecting side and end surface of said well and having a bottom surface generally parallel and non-planar with said well bottom surface, said stepped surface being irregular so that an impression made therefrom resembles mortar in surface texture; and a first planar surface on said second mold part, a raised generally rectangular portion extending from said first planar surface and having side and top surfaces, a plurality of grooves formed in said raised portion top surface, said grooves having a flat bottom surface generally coplanar with said first planar surface, a plurality of depressions formed in said raised portion top surface having a depth not exceeding the depth of said grooves, with said raised portion having a length, width and height dimension respectively less than the length, width and depth dimension of said well.

References Cited

UNITED STATES PATENTS

| | | | |
|---|---|---|---|
| 2,272,718 | 2/1942 | MacLogan et al. | 249—67 |
| 3,139,655 | 7/1964 | Cooper et al. | 249—81 X |
| 3,161,918 | 12/1964 | Zearbaugh | 249—68 |
| 3,300,816 | 1/1967 | Ochner. | |

J. HOWARD FLINT, Jr., *Primary Examiner.*

U.S. Cl. X.R.

18—2, 42; 249—81, 140